UNITED STATES PATENT OFFICE.

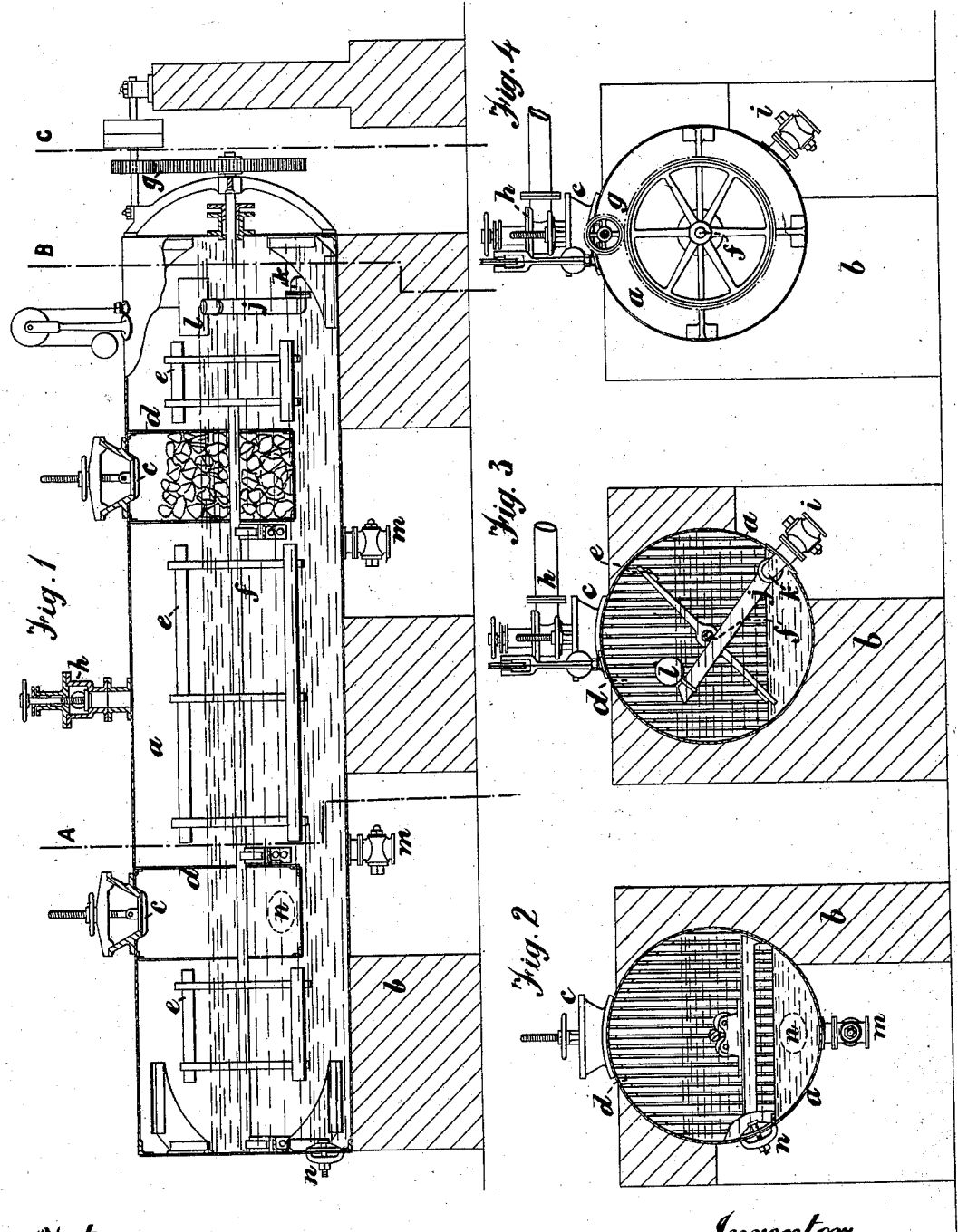

EDWARD W. PARNELL, OF LIVERPOOL, ENGLAND, ASSIGNOR OF ONE-HALF HIS RIGHT TO JAMES SIMPSON, OF SAME PLACE.

IMPROVEMENT IN APPARATUS FOR THE MANUFACTURE OF CAUSTIC ALKALIES.

Specification forming part of Letters Patent No. 203,555, dated May 14, 1878; application filed March 14, 1878.

*To all whom it may concern:*

Be it known that I, EDWARD WILLIAM PARNELL, of Liverpool, in the county of Lancaster, England, have invented an Improvement in Apparatus or Appliances to be used in the Manufacture of Caustic Alkalies, of which the following is a specification:

The object of the said invention is to provide simple and efficient apparatus to be used in the manufacture of caustic soda and potassa by the novel process for which I have applied for Letters Patent of the United States simultaneously with this.

Figure 1 is a longitudinal section, and Figs. 2, 3, and 4 transverse sections at the lines A B C, of apparatus or appliances constructed under my invention.

The said apparatus consists, first, of a vessel, $a$, preferably of wrought-iron, supported in any convenient manner, such as by brickwork $b$; $c$, doors through which a solution of carbonate of soda or potassa, or both, of comparatively high density, and caustic lime are fed to the said vessel; $d$, cages in which the pieces of caustic lime are held in suspension, and prevented, as well as stones or other foreign objects, from falling to the bottom of the vessel and mixing with the carbonate-of-lime precipitate formed during the reaction; $e$, agitators fixed on the shaft $f$, and caused to rotate by the gearing $g$; $h$, pipe and valve through which steam is admitted from a generator to act on the materials in the interior of the vessel; $i$, cock for drawing off the caustic soda and potassa solutions. The said cock is fitted with the pipe $j$, hinged at $k$, and fitted at its upper end with the float $l$, so as to be free to rise and fall with the rise and fall of the liquid in $a$; $m$, cocks through which the carbonate-of lime precipitate produced is removed; $n$, cleaning-doors.

The operation is as follows: The desired quantity of the alkaline carbonate solutions and caustic lime having been filled into the vessel $a$, the doors $c$ are closed, steam at a high temperature and pressure admitted through the valve $h$ to act on the contents of $a$, and the agitators $e$ are caused to revolve. As soon as a sufficiently-high temperature has been attained the caustic lime and alkaline carbonates react on each other, and caustic soda or potassa, or both, in solution, and carbonate-of-lime precipitate are produced. The solution of caustic soda or potassa, or both, is now drawn off through the cock $i$, the steam being allowed to act so as to maintain the necessary temperature and pressure to prevent the reversal of the reaction, which would take place if the temperature were lowered while the carbonate of lime and caustic alkaline solutions were in contact. After all the caustic soda and potassa has been drawn off, the carbonate-of-lime precipitate is removed through the cocks $m$, and the vessel is ready for recharging.

Having now described my invention so that others will be enabled to carry my improvements into effect, I claim—

1. The apparatus for the manufacture of caustic alkali, consisting of the closed vessel adapted to sustain steam-pressure, said vessel provided with a valved steam-inlet, an automatically-adjustable draw-off pipe for the caustic alkali, discharge-cocks for the precipitate, and an agitator arranged within the vessel, substantially as specified.

2. In an apparatus for the manufacture of caustic alkali, the closed vessel provided with the steam-inlet, the charging orifices and cages arranged thereat, discharge-cocks for the caustic alkali and precipitate, and the agitator arranged within the vessel, the whole constructed substantially as specified.

E. W. PARNELL.

Witnesses:
JAMES JOHNSON,
W. B. JOHNSON.